(12) United States Patent
Green et al.

(10) Patent No.: US 8,930,021 B2
(45) Date of Patent: Jan. 6, 2015

(54) INTERCHANGEABLE MODULAR ROBOTIC UNIT

(71) Applicants: Ramon Green, Boston, MA (US); Peter Schmidt, Newburyport, MA (US)

(72) Inventors: Ramon Green, Boston, MA (US); Peter Schmidt, Newburyport, MA (US)

( * ) Notice: Subject to any disclaimer, the term of this patent is extended or adjusted under 35 U.S.C. 154(b) by 128 days.

(21) Appl. No.: 13/779,218

(22) Filed: Feb. 27, 2013

(65) Prior Publication Data

US 2013/0226342 A1    Aug. 29, 2013

Related U.S. Application Data

(60) Provisional application No. 61/603,647, filed on Feb. 27, 2012.

(51) Int. Cl.
  *G06F 19/00* (2011.01)

(52) U.S. Cl.
  USPC ............................................. 700/245; 701/41

(58) Field of Classification Search
  USPC ............ 701/41; 700/245; 180/65.5, 65.1, 2.2, 180/8.2; 105/11.4, 49
  See application file for complete search history.

(56) References Cited

U.S. PATENT DOCUMENTS

| | | | |
|---|---|---|---|
| 6,742,741 B1 * | 6/2004 | Rivoli | 244/12.1 |
| 2005/0137749 A1 * | 6/2005 | Jeon et al. | 700/245 |
| 2005/0150074 A1 * | 7/2005 | Diehl et al. | 15/327.5 |
| 2005/0166354 A1 * | 8/2005 | Uehigashi | 15/319 |
| 2005/0183230 A1 * | 8/2005 | Uehigashi | 15/319 |
| 2005/0217042 A1 * | 10/2005 | Reindle | 15/41.1 |
| 2005/0229340 A1 * | 10/2005 | Sawalski et al. | 15/50.3 |
| 2006/0021168 A1 * | 2/2006 | Nishikawa | 15/49.1 |
| 2006/0107894 A1 * | 5/2006 | Buckley et al. | 118/207 |
| 2006/0150361 A1 * | 7/2006 | Aldred et al. | 15/319 |
| 2014/0076642 A1 * | 3/2014 | Gettings et al. | 180/9.1 |

* cited by examiner

*Primary Examiner* — Ronnie Mancho
(74) *Attorney, Agent, or Firm* — Bay State IP, LLC

(57) ABSTRACT

A modular, mobile, robotic unit having an octagon frame with a removable top and a bottom. The frame is of a substantial diameter to hold various attachments. Centered on the faces of the sides of the frame are utility augment ports capable of equipping utility augments. A magnetic fastener strip is located between a plurality of utility augment port shields and a magnet. The frame has an inner compartment housing a plurality of electronics and a plurality of components. The frame has a main compartment crib enclosure, a power supply crib enclosure located below the main compartment crib enclosure, and a waterproof crib enclosure coupled to a platform on the top of the frame. Ultrasonic collision detection sensors are attached to the sides of the frame. Mobility augmentation ports are coupled onto the top and bottom of the frame to hold mobility augments for attaching various transportation methods.

20 Claims, 16 Drawing Sheets

INTERCHANGEABLE MODULAR ROBOTIC UNIT

CROSS REFERENCE TO RELATED APPLICATION

This application claims the benefit of and takes priority from U.S. App. No. 61/603,647, filed on Feb. 27, 2012, the contents of which are hereby incorporated by reference.

FIELD OF THE INVENTION

The present system relates to a modular robotic unit capable of holding and utilizing various forms of interchangeable input, output, and static and dynamic expansions simultaneously.

BACKGROUND OF THE INVENTION

There exist a number of modular robotic units within the field of robotics that are adaptable for various attachments and are mobile on the ground.

The known modular robotic units capable of adapting to different payloads and hazard prevention are not able to exchange forms of mobility. Other known robotic units are unable to adapt to various unforeseen environments and tasks. These types of robotic units require the user to assemble the robotic unit without any core programming installed.

An advance in the art may encompass a robotic unit that has the capability of adapting to unforeseen tasks using a variety of interchangeable modular attachments simultaneously. A further advance may comprise a robotic unit that has the capability of operating on the ground, in/on water, and in the air to allow for further application of the unit.

SUMMARY OF THE INVENTION

The instant apparatus and system, as illustrated herein, is clearly not anticipated, rendered obvious, or even present in any of the prior art mechanisms, either alone or in any combination thereof. The versatile system, method and series of apparatuses for creating and utilizing an interchangeable modular robotic unit are illustrated. Thus the several embodiments of the instant apparatus are illustrated herein.

It is therefore an object of this to perform small-scale tasks that are otherwise tedious, difficult or impossible for humans to perform with an assortment of attachment modules.

It is a further object of this system to perform these tasks in unforeseen environments and having the capacity to being mobile both by ground and by air.

It is a further object of the subject system to introduce a modular robotic unit with unlimited mobility capacity in conjunction with the capability of housing various utility attachments and mobility attachments.

It is a further object of the subject system to reveal a modular robotic unit comprising a multi-sided frame capable of holding and utilizing various interchangeable modular attachments simultaneously. In conjunction with above, it is also an object to introduce a multi-sided frame which consists of an upper segment, a middle segment, and a lower segment wherein the sides of the frame may hold utility augments coupled to utility augment ports.

Inside the frame there may exist a set of various compartments housing electronics and components. The main components inside the frame are a set of utility augment port crib enclosures; a set of collision detection sensors to detect objects and obstacles and to prevent collisions; a power source; a set of lock couplings for secure fastening between utility augments and the robotic unit; and a set of motherboards consisting of a microcontroller, a central processing unit, a memory card, and an inertial measurement unit. The inertial measurement unit has an accelerometer and a gyroscopic sensor for the stability of the unit. The upper and lower segments of the frame expose mobility augment ports for various mobility and dynamic method attachments. The top of the frame has a platform with a waterproof crib enclosure coupled to it. Ultrasonic collision detector sensors are coupled to the sides of the frame underneath the utility augment ports.

There has thus been outlined, rather broadly, the more important features of the versatile interchangable modular robotic unit, and series of accompanying systems and apparatuses and embodiments in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

To the accomplishment of the foregoing and related ends, certain illustrative aspects are described herein in connection with the following description and the annexed drawings. These aspects are indicative of the various ways in which the principles disclosed herein can be practice and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

Advantages of the present apparatus will be apparent from the following detailed description of exemplary embodiments thereof, which description should be considered in conjunction with the accompanying drawings, in which, having thus described the system in general terms, reference will now be made to the accompanying drawings, which are not necessarily drawn to scale, and wherein.

DETAILED DESCRIPTION OF THE INVENTION

The detailed description set forth below is intended as a description of presently preferred embodiments of the system and does not represent the only forms in which the present system may be construed and/or utilized. The description sets forth the functions and the sequence of the steps for producing the system. However, it is to be understood that the same or equivalent functions and sequences may be accomplished by different embodiments also intended to be encompassed within the scope of the system.

The unique characteristic of the present system is the ability to mobilize the system by various transportation methods while also holding a variety of utility attachments.

Figure 1:
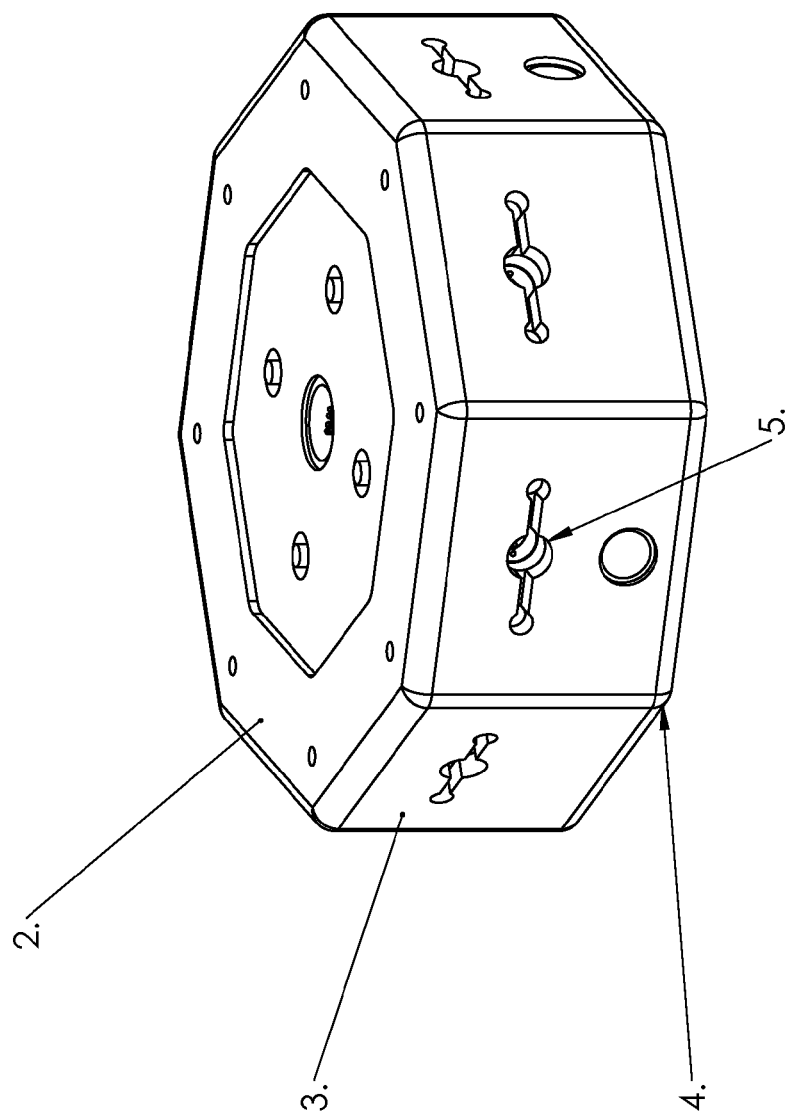
FIG. 1 is a perspective view of the fully assembled robotic unit.

FIG. 1 is a perspective view of an embodiment of the instant system. A fully assembled modular robotic unit 50 comprises a multi-sided frame 1 composed of an upper segment 2, middle segment 3, lower segment 4, and an inner central compartment 10 holding a crib enclosure 11. The middle segment 3 joins the upper segment 2 and lower segment 4 via their respective fastener inserts in correspondence with the fastener apertures or holes of the middle segment. The fully assembled frame 1 has a substantial diameter to hold a plurality of attachments.

Figure 2:
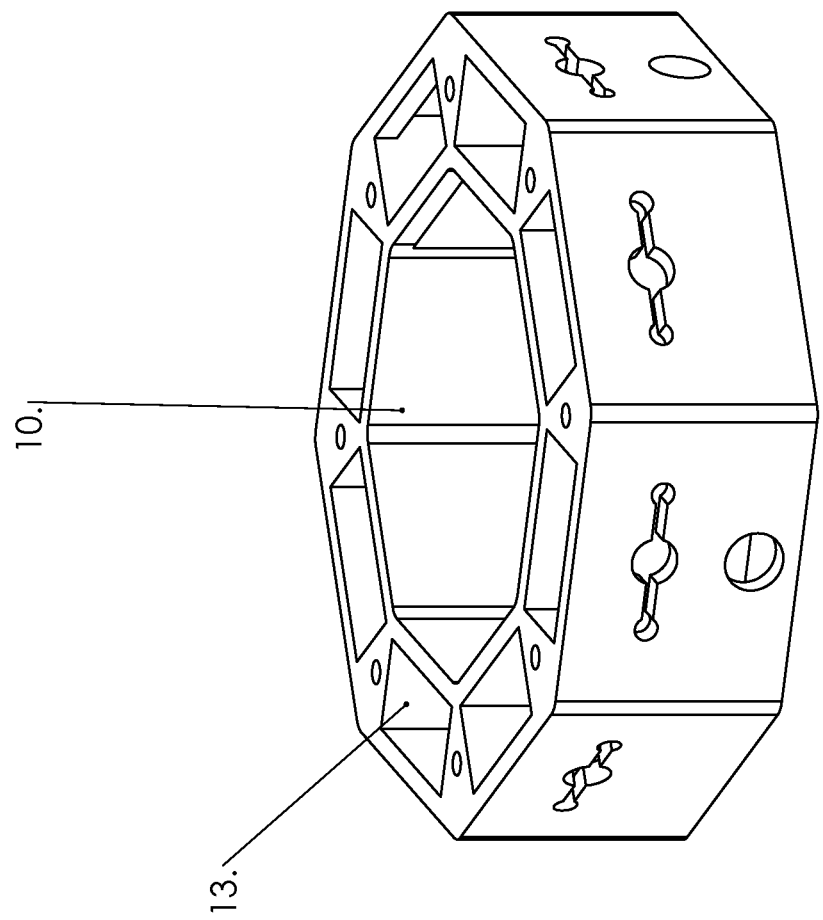
FIG. 2 is a perspective view of the robotic unit partially assembled without the upper segment, exposing the inner compartments with the added components.

FIG. 2 is a perspective view of the middle segment 3, exposing the inner compartments without the added components. The middle segment 3 comprises an inner central compartment 10 and multiple utility augment port crib enclosure compartments 13. An inner central compartment crib enclosure 11 fits within the inner central compartment 10, and a plurality of utility augment port crib enclosures 14 fit within the plurality of utility augment port crib enclosure compartments 13.

Figure 3:
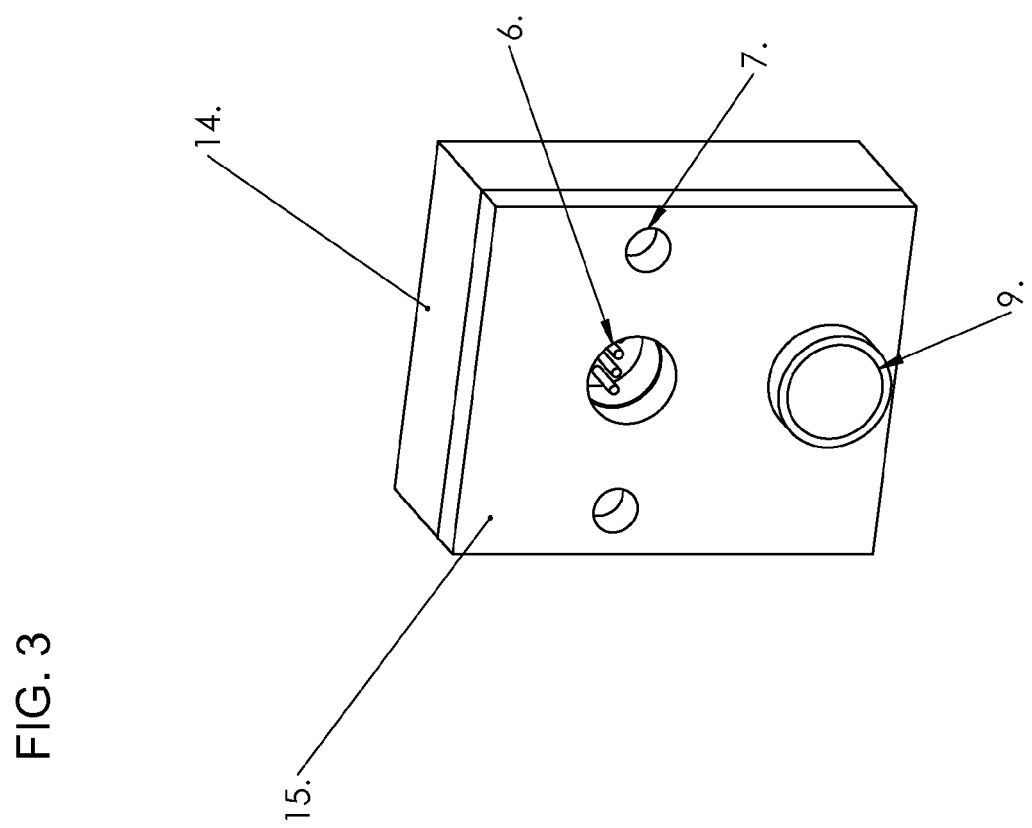
FIG. 3 is a perspective view of the utility augment port crib enclosure.

FIG. 3 is a perspective view of the utility augment port crib enclosure 14, which may store a plurality of electronics, components, and power supplies. A plurality of utility augment port crib enclosures 14 fit within the plurality of utility augment port crib enclosure compartments 13. A utility port crib enclosure may comprise several features, including a removable cover 15 to protect inner electronics and components, a utility augment port connector 6 to engage with utility augments, a utility augment port fastener aperture 7, which securely fastens utility augments and perhaps a collision detection sensor 9.

Figure 4:
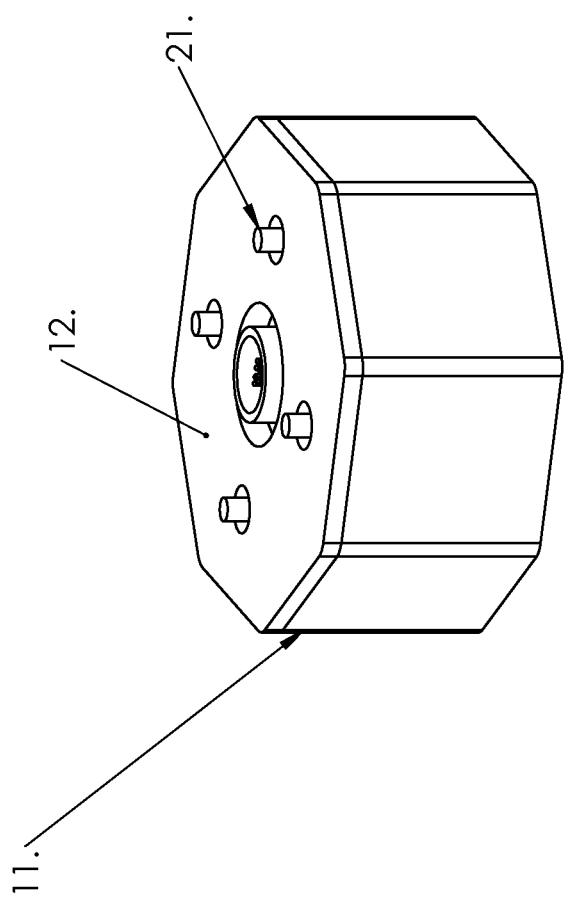
FIG. 4 is a perspective view of the inner central compartment.

FIG. 4 is a perspective view of an inner central compartment crib enclosure 11. The inner central compartment crib enclosure 11 holds a plurality of electronics, components, and a power supply, and may be protected by a removable cover 12. Mobility augment male type fastener connections 21 extend through the removable cover 12 and provide a secure connection for mobility augments.

[4] Referring to Figures X-Y, the sides of the fully assembled frame hold a plurality of utility augments 60 preferably removably fastened to the standard utility augment ports 12, thus adding features to the robotic device. A plurality of utility augment port crib enclosures 14 protects the electronics and components inside the inner compartment by serving as a shield between the exterior and interior. Utility augments 60 are removably fastened by first placing the male type connector of the utility augment 62 into the utility augment port 5, engaging with utility augment connector 6. The utility augment 60 is then securely fastened with the corresponding utility augment fastener holes 7. The user may access these utility augment ports on the exterior sides of the frame 1 located in the middle segment 3. Although it is described here as a specific means of fastening, these utility augments can be removably fastened using a variety of coupling techniques and methods. There are no predefined means of removably fastening these utility augments to the side of the frame of the unit.

Figure 5:
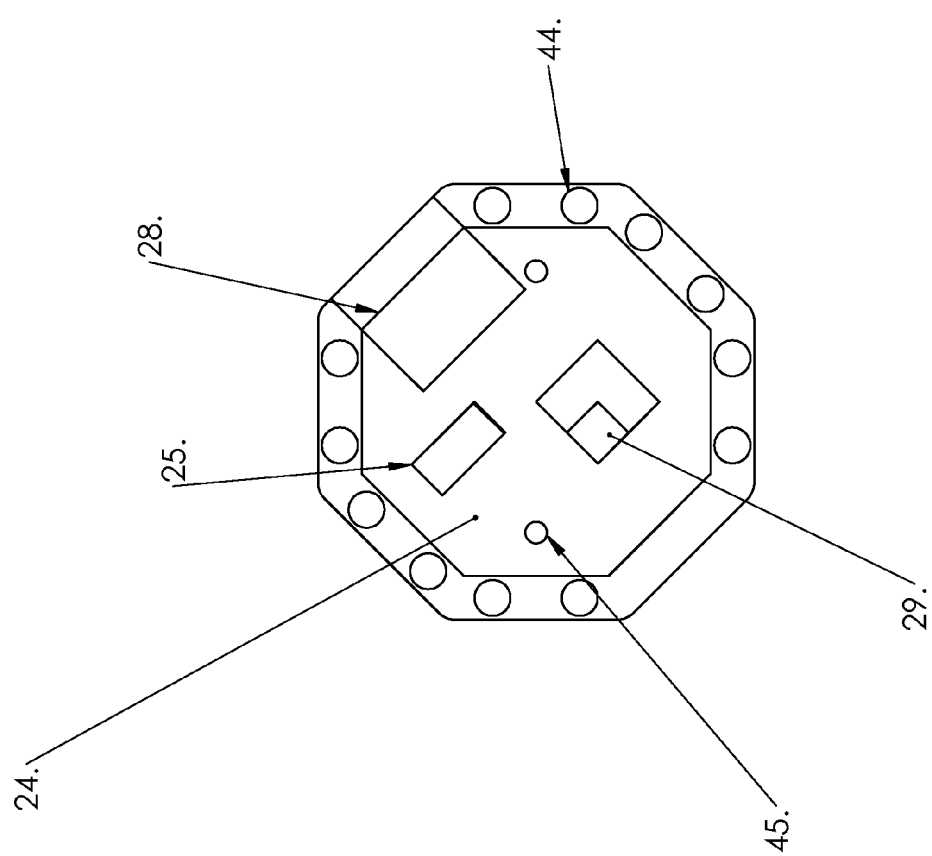
FIG. 5 is a top plan view of the inner central compartment, exposing the motherboard layer.
Figure 6:
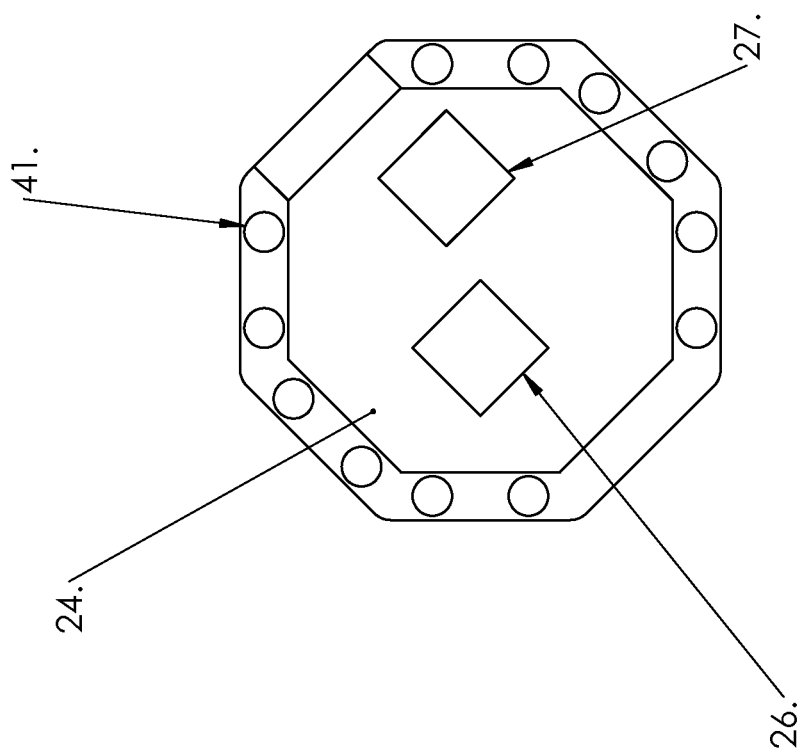
FIG. 6 is a top plan cutaway view of the inner central compartment, exposing the inner compartments with the added components.

Referring to FIGS. 5 and 6, the utility compartment crib enclosure 11 may have several layers storing a variety of components. In a preferred embodiment, the main components consist of one or more motherboards 24 consisting of a microcontroller 25, a central processing unit 26, a memory card 27, and 802.11g/n compatible wireless network adapter 28, and an inertial measurement unit 29. The wireless adapter 28 allows users to connect to the unit from a remote system such as a computer, a tablet, or a smartphone. In this embodiment, the inertial measurement unit 29 consists of an accelerometer and a plurality of gyroscopic sensors connected to the microcontroller, used to calibrate and balance the unit. The layers are secured with an inner central compartment multilayer insert 45. The internal components are protected by applying a removable cover 12 over the enclosure 11.

Figure 7:
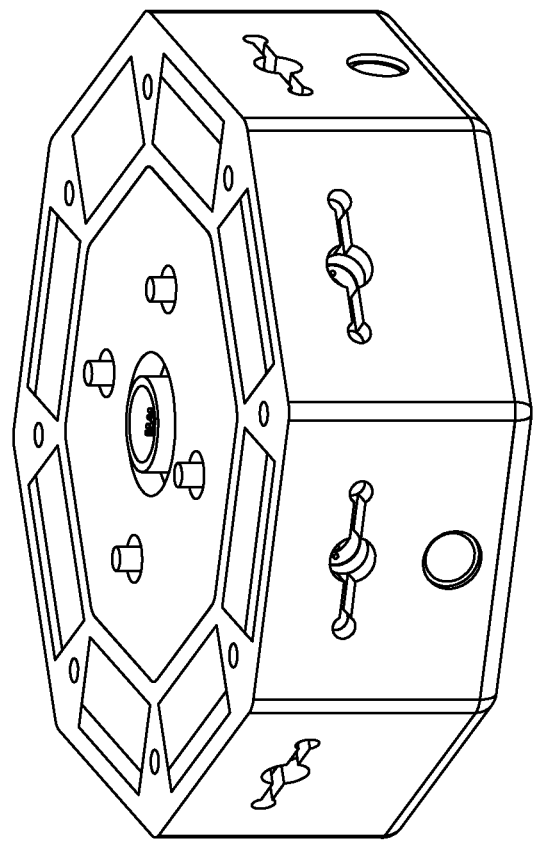
FIG. 7 is a perspective view of the middle segment, exposing the inner compartments without the added components.
Figure 8A:
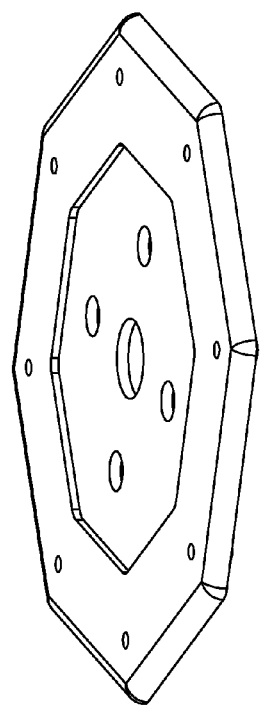
FIG. 8A is a perspective view if the upper segment.
Figure 8B:
FIG. 8B is a side view of the upper segment.

FIG. 7 is a perspective view of the robotic unit partially assembled without the upper segment 2, exposing the inner compartments 11 13 with the added components. A plurality of collision detector sensors 9 are housed within the utility augment electronics and components crib enclosure 15. In this preferred embodiment, the ultrasonic collision detector sensors 9 are located at the front, left, right, and back sides of the robotic unit, facing away from the center of the robotic unit. These collision detector sensors are preferably exposed on the exterior sides of the robotic frame 1 directly below the utility augment ports 5, to detect objects and obstacles and to prevent collisions. Thus, the ultrasonic collision detector sensors sweep comprises a range of 360 degrees out from the center of the robotic unit.

Referring to FIGS. 8A, 8B, 9, and 10, the upper segment 2 and lower segment 4 are coupled to the middle segment 3 via the upper segment mounting platform 23 and lower segment mounting platform 24. The upper segment 2 attaches to the upper segment mounting platform 22 by aligning the upper segment connection fastening inserts 42 with the upper segment connector fastening hole 16. Similarly, the lower segment 4 attaches to the lower segment mounting platform 23 by aligning the lower segment connection fastener inserts 43 with the lower segment fastening hole 17.

Figure 11:
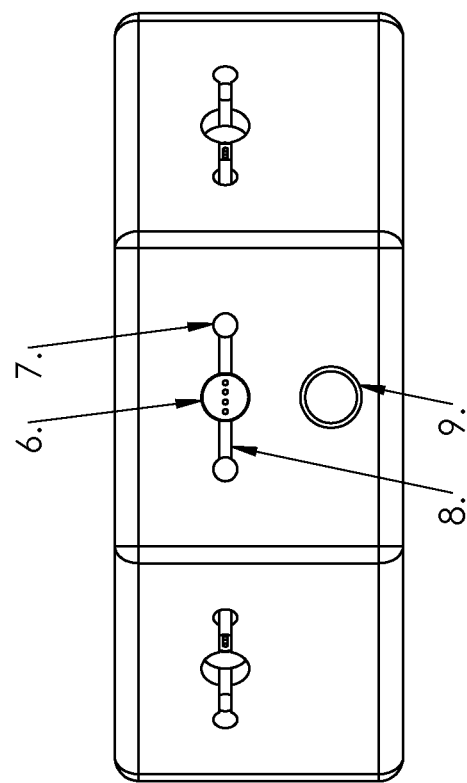
FIG. 11 is a front plan view of the complete robotic unit, exposing the utility augment port.

FIG. 11 is a side plan view of the complete robotic unit, exposing the utility augment port connector 6. The utility augment port connector 6 to engage with utility augments, and further comprises a utility augment port fastener hole 7, which securely fastens utility augments; a utility augment port stabilizer insert 8; and a collision detection sensor 9.

A utility port crib enclosure has several features, including a removable cover 15 to protect inner electronics and components; a utility augment port connector 6 to engage with utility augments; a utility augment port fastener hole 7, which securely fastens utility augments; and perhaps a collision detection sensor 9.

Figure 12:
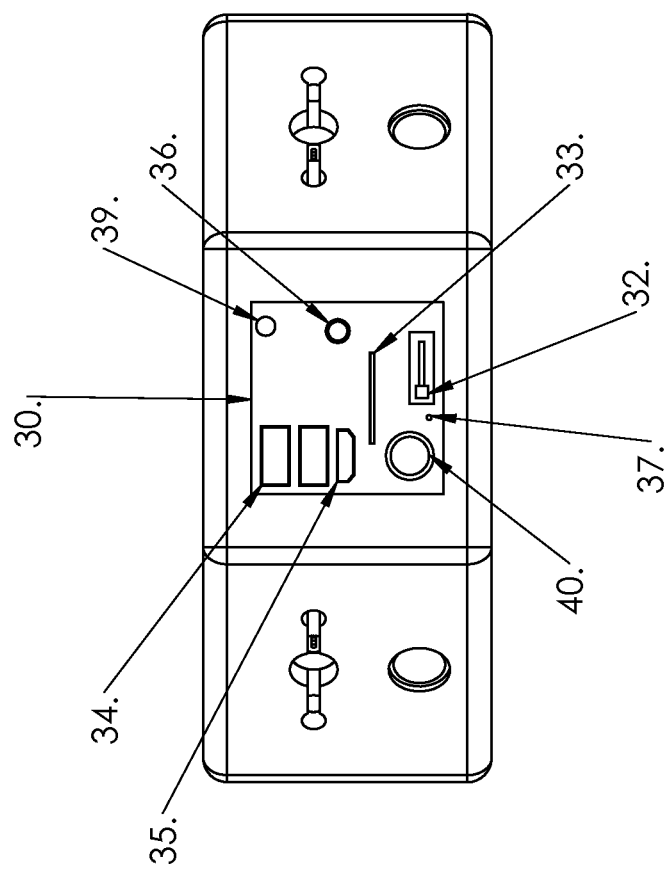
FIG. 12 is a side plan view of the complete robotic unit, exposing the auxiliary hub.

FIG. 12 is a side plan view of the complete robotic unit, exposing the auxiliary hub. In another preferred embodiment, the robotic unit has an auxiliary hub 30 accessible on one of the many side-faces of the robotic unit having a power switch 32, a slot to access the memory card 33, a plurality of USB ports 34, an auxiliary power supply port 40 for an optional means to power and/or recharge the robotic unit, a wi-fi antenna connector port 36 to extend wifi reception, a wireless utility augment antenna connector port to extend the wireless utility augment port 36, one or more multimedia ports 35, a waterproof plate port for waterproofing the auxiliary hub connections, and a "disable recovery mode" pin 37. This auxiliary hub is coupled to a compartment located inside the middle segment frame. It is protected by the upper segment frame when fastened and fully assembled. The user may access this auxiliary hub on the exterior sides of the middle segment frame. On this same face, the auxiliary hub has a LED status indicator 39. In this embodiment, a red illumination of the LED indicates that the unit is booting. A green illumination of the LED indicates that the unit is booted and ready for command.

Figure 9:
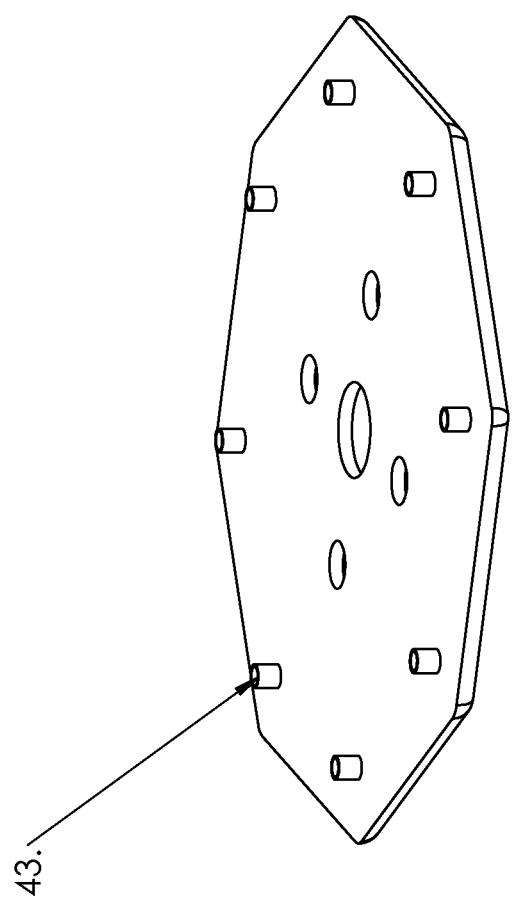
FIG. 9 is a perspective view of the lower segment.
Figure 10:
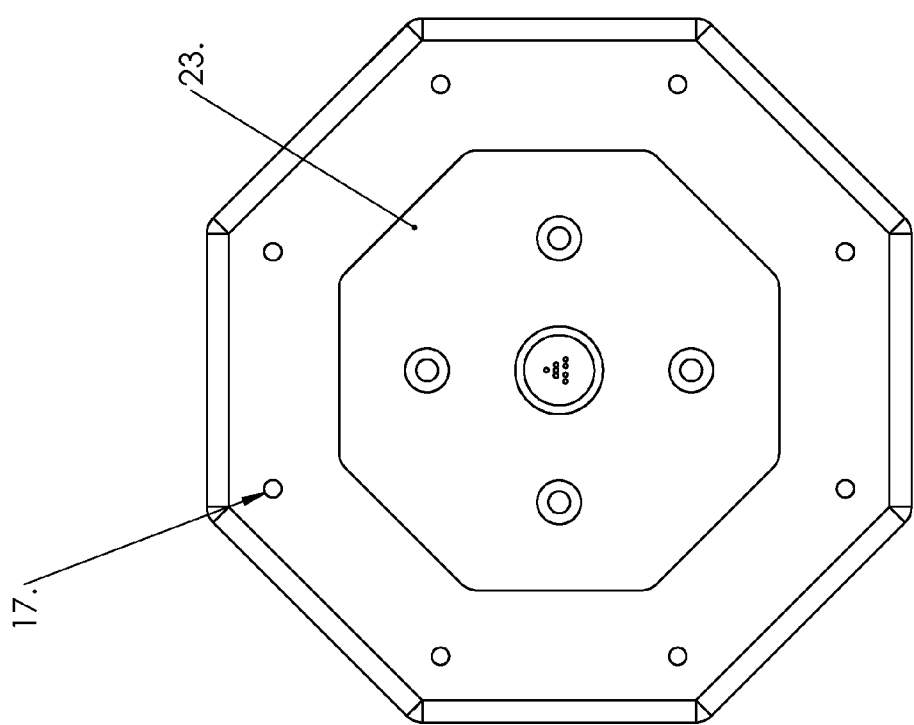
FIG. 10 is a bottom plan view of the complete robotic unit, exposing the lower mobility augment port.
Figure 13:
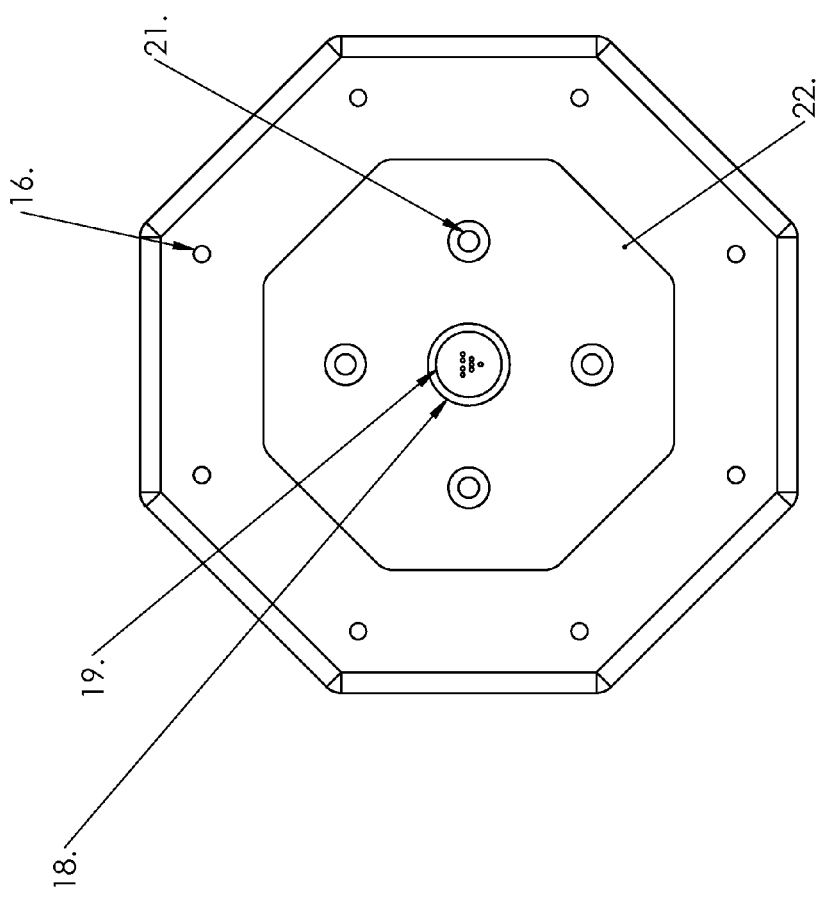
FIG. 13 is a top plan view of the complete robotic unit, exposing the upper mobility augment port.

FIG. 13 is a top plan view of the complete robotic unit, exposing an upper mobility augment port 18, and FIG. 9 is a bottom plan view of the complete robotic unit, exposing a lower mobility augment port 18. A plurality of mobility augments are coupled to a plurality of mobility augment ports 18 on the upper segment 2 and lower segment 4 of the fully assembled frame, preferably removably fastened, for various transportation and dynamic methods. These mobility augments are held in place by a male-type fastener connector 21 located within the inner compartment of the frame of the middle segment 3 and a female type fastener connector located on the mobility augments.

Mobility augments are coupled by aligning the mobility augment male type fastener connectors 21 with the female type fastener connectors on the mobility augments, and placing the mobility augments onto the mounting platforms 22 23 of the upper 2 or lower 4 segments of the fully assembled frame. The male type fastener connectors 21 from the frame are then coupled with the female type fastener connectors from the mobility augment. Contact is made between the mobility augment female port located within the frame and the mobility augment male connectors located on the mobility augment, wherein; at least a first portion of the female receptacles are operative to be moved from a first position to a second position; when at least the first portion of the female receptacles are in the first position, the female receptacles are disconnected from the central compartment crib enclosure electronics and components therefore providing a means of waterproofing; and when at least the first portion of the female receptacles is in the second position.

The spring mechanisms are preferably located beneath the first portion of the female receptacles are contracted allowing the main connection pins, which connects the plurality of pins exposed on the upper and lower segments of the frame into individual pins in order to make contact with the central compartment crib enclosure electronics and components. This preferable setup allows for a waterproofing method for the mobility augment ports by disconnecting the exposed pins from the inner central compartment electronics and components.

Although herein described are specific means of fastening the mobility augments, these apparatuses may be removably fastened using a variation of coupling techniques and methods. There are no predefined means of removably fastening these mobility augments to the upper and lower segments of the unit. Additionally, the user may access the ports for the mobility augment on the exterior upper and lower segments of frame.

In another embodiment, the plurality of utility augments include sensors and electronic devices; mounting brackets and converter platforms; or other interactive devices such as a grabber claw.

Figure 14:
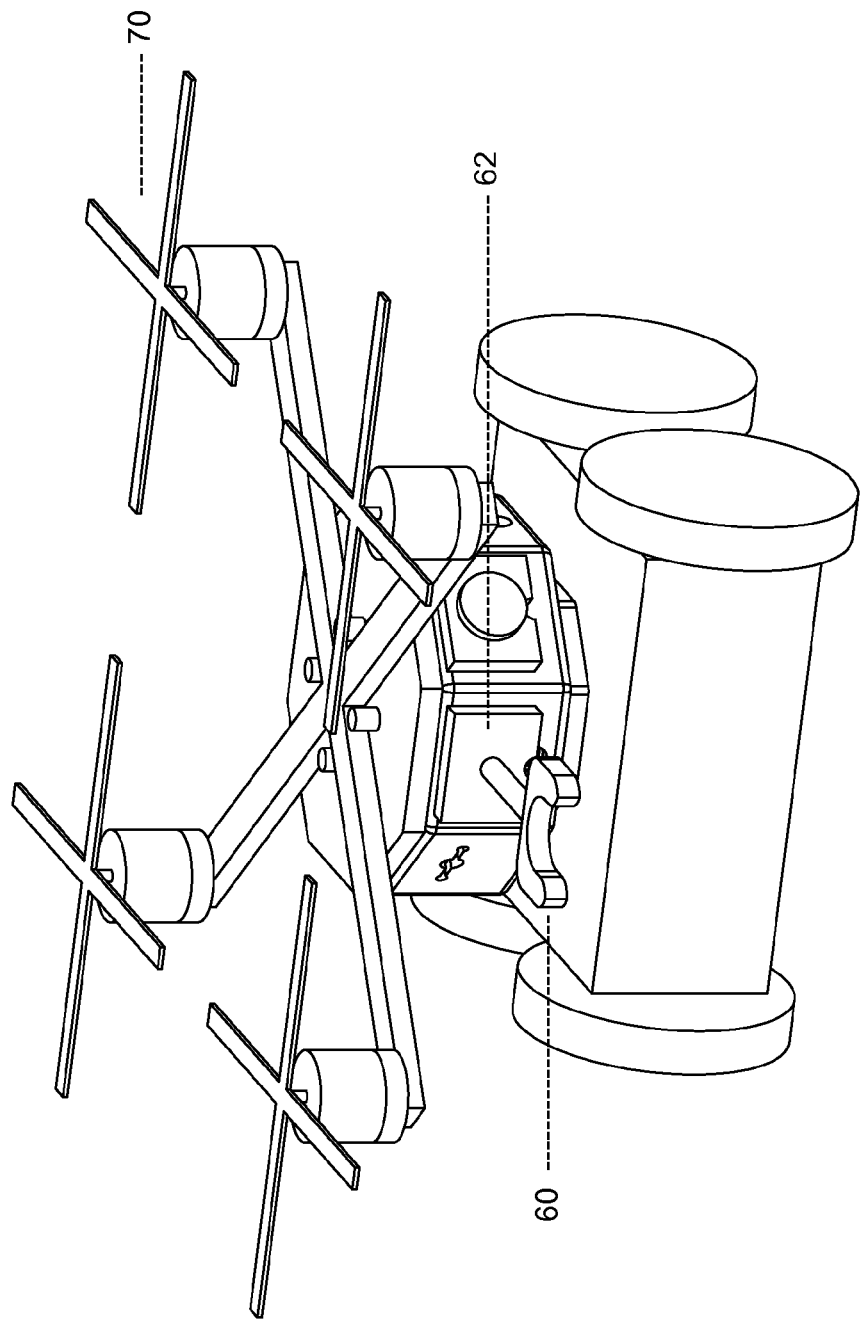
FIG. 14 is a perspective view of a completely assembled robotic unit equipped with the various mobility and utility augments.
Figure 15:
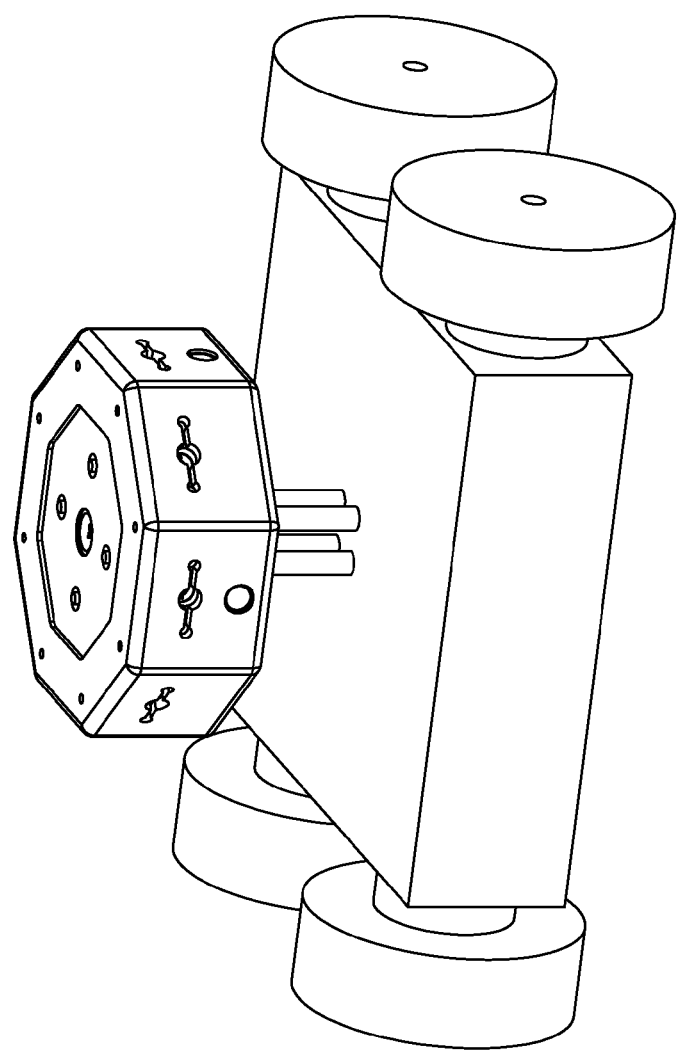
FIG. 15 is a perspective view of the complete robotic unit equipped with a single mobility augment.
Figure 16:
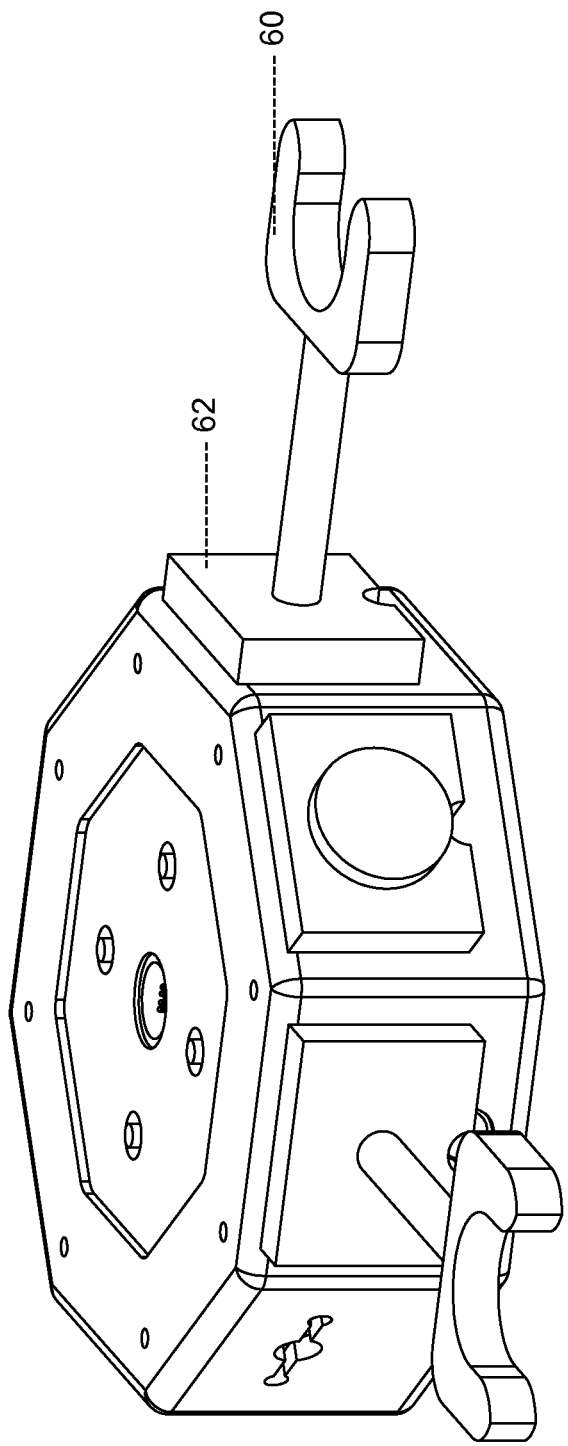
FIG. 16 is a perspective view of the complete robotic unit equipped.

Referring to FIGS. 14-16, embodiments of the present system and various mobility augments are shown. In another preferred embodiment, the plurality of mobility augments that are attachable to the robotic unit include but are not limited to: a plurality of shafts coupled to the bottom of the frame and holding a plurality of wheels; ground locomotive and dynamic platforms including wheeled and tracked platforms; aquatic locomotive and dynamic platforms including underwater turbine and above water floatation platforms; aerodynamic platforms and systems including quad-rotor platforms; advanced locomotive and dynamic platforms and systems including humanoid and bipedal platforms and systems.

In another exemplary embodiment of the instant system, the mobility augment is a rotor system 70 is coupled to the top of the frame. In certain embodiments, the robotic unit provides a plurality of other systems and modules with a means of robotic control to those other systems and modules including but not limited to; vehicle and transport systems; structures and facilities; and systems and methods. In these certain embodiments, the robotic unit provides a plurality of those other systems and modules with a means of robotic control such as but not limited to secondary sensory perception, performance optimization, and automation.

What is claimed is:
1. A modular robotic unit comprising:
 a multi-sided frame, comprising a removable top and a bottom, of a substantial diameter to hold a plurality of attachments;
 a set of utility augment ports centered on a face of the multi-sided of the frame;
 a set of utility augments attached to the set of utility augment ports;
 a set of utility augment port shields, wherein a magnetic fastener strip is located between a set of shields and a magnet;
 an inner compartment of the frame housing a set of electronics and a set of components;
 a main compartment crib enclosure located within the frame;
 a power supply crib enclosure located below the main component crib enclosure;
 a platform coupled onto the removable top of the frame housing the set of attachments;

a waterproof crib enclosure coupled to a top of the platform;

a set of ultrasonic collision detector sensors coupled to the sides of the frame below the utility augment ports;

a set of mobility augment ports coupled on the removable top and the bottom of the frame; and a mobility augment located on the removable top and the bottom of the frame disposed to attach a set of transportation methods.

2. The modular robotic unit of claim 1, wherein the set of main components further comprise a microcontroller, a central processing unit, a SD memory card, and an inertial measurement unit.

3. The modular robotic unit of claim 2, wherein the central processing unit further comprises a USB wireless adapter disposed to allow a user to access the robotic unit using any networked device selected from the group consisting of a computer, a tablet, or a smartphone.

4. The modular robotic unit of claim 2, wherein the inertial measurement unit further comprises an accelerometer and a gyroscope sensor connected to the microcontroller.

5. The modular robotic unit of claim 1, wherein the frame further comprises a LED status indicator, wherein the LED illuminates red when the unit is booting, illuminates green when the unit is ready for command and illuminates yellow when the unit is attempting recovery from a potentially hazardous or unsuitable environment and is not accepting command.

6. The modular robotic unit of claim 1, wherein the utility augment ports house a set of utility augments selected from the group consisting of sensors, mounting brackets, and interactive devices.

7. The modular robotic unit of claim 6, wherein the utility augments are removably pinned to the utility augment ports.

8. The modular robotic unit of claim 1, wherein the ultrasonic collision detector sensors sweep comprises a range of 360 degrees out from a center of the robotic unit.

9. The modular robotic unit of claim 1, further comprising a secondary utility augment hub comprising a power switch; a SD card slot, a plurality of USB ports; an auxiliary power supply port; and a simple two-pin communications port.

10. The modular robotic unit of claim 1, further comprising a Lithium-Ion battery pack.

11. The modular robotic unit of claim 1, wherein the mobility augment further comprises:

a plurality of rotatable shafts coupled to the bottom of the frame, further comprising a plurality of wheels; and a rotor system coupled to a top portion of the frame.

12. A robotic unit comprising:

a frame apparatus comprising an internal portion comprising at least two compartments, wherein the at least two compartments house a set of systems electronics and a set of systems components wherein the systems components comprise:

a set of utility augment port crib enclosures;

a set of collision detection sensors to detect objects and obstacles and to prevent collisions;

at least one power source;

a set of lock couplings;

and a set of motherboards comprising wherein each of the set of motherboards comprises:

a microcontroller;

a central processing unit;

a memory card; and, an inertial measurement unit.

13. The robotic unit of claim 12 wherein the inertial measurement unit comprises an accelerometer and a gyroscopic sensor for control of the stability of the robotic unit.

14. The robotic unit of claim 12 wherein the frame apparatus comprises an upper segment and a lower segment and a set of mobility augment ports disposed to receive a set of mobility and dynamic attachments.

15. The robotic unit of claim 12 wherein the frame apparatus comprises an upper portion and the upper portion comprises a platform comprising a utility crib enclosure.

16. The robotic unit of claim 12 wherein the frame apparatus comprises a set of side portions and the side portions comprise a set of ultrasonic collision detector sensors attached to the side potions of the frame apparatus.

17. The robotic unit of claim 12 wherein the frame apparatus further comprises a set of lock couplings in mechanical communication with the utility augments and in mechanical communication with the robotic unit in order to join the utility augments to the robotic unit.

18. The robotic unit of claim 15 wherein the utility port crib enclosure comprises:

a removable cover;

a utility augment port connector; and, a utility augment port fastener aperture.

19. The robotic unit of claim 12 further comprising a set of utility augments.

20. The robotic unit of claim 19 wherein the set of utility augments is selected from group consisting of sensors, electronic devices, mounting brackets, converter platforms and grabber claws.

* * * * *